Jan. 29, 1935. L. HERSOT 1,989,194
BRAKE
Original Filed Feb. 11, 1929 2 Sheets-Sheet 1
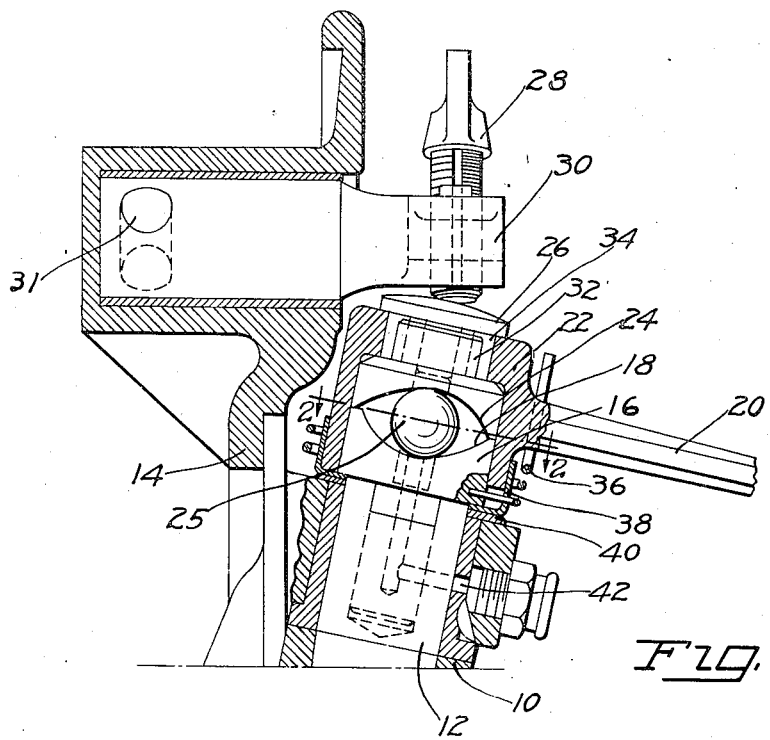
Fig. 1
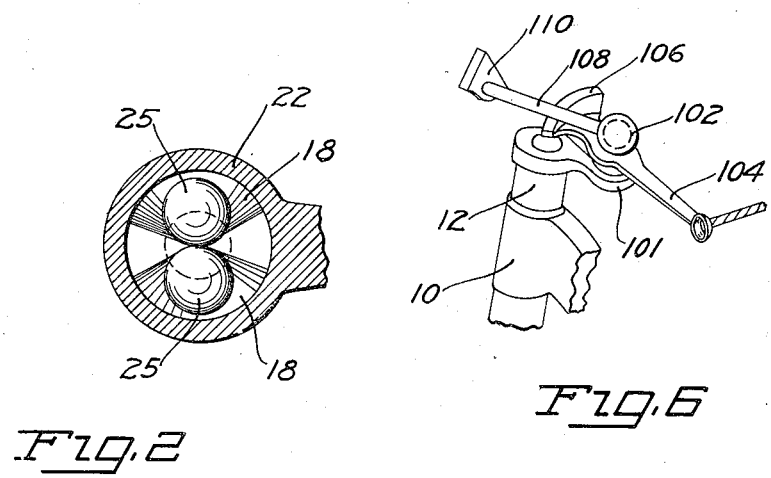
Fig. 2
Fig. 6
INVENTOR.
LUCIEN HERSOT
BY
ATTORNEY Jan. 29, 1935. L. HERSOT 1,989,194
BRAKE
Original Filed Feb. 11, 1929   2 Sheets-Sheet 2
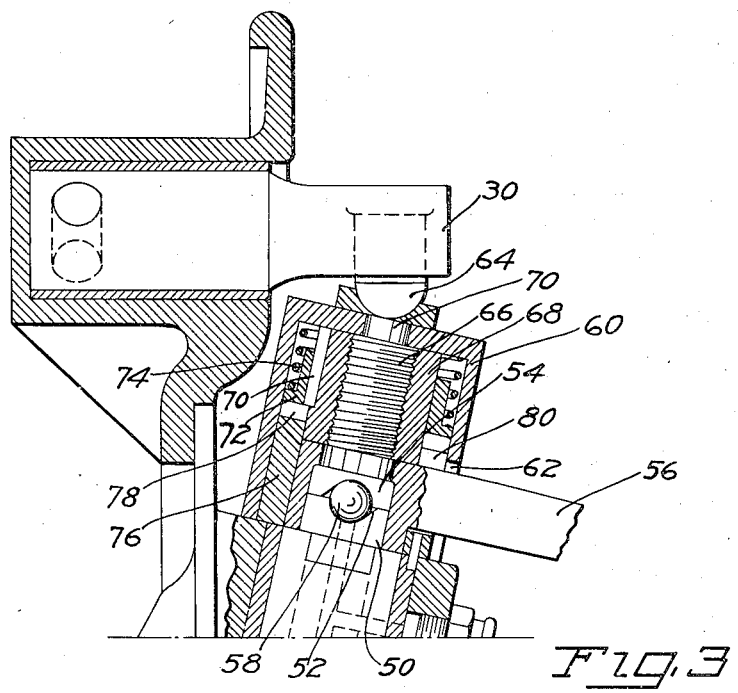
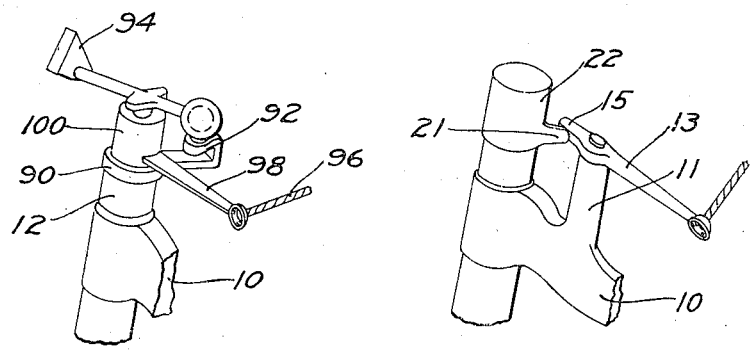
INVENTOR.
LUCIEN HERSOT
BY
ATTORNEY Patented Jan. 29, 1935

1,989,194

UNITED STATES PATENT OFFICE 1,989,194

BRAKE

Lucien Hersot, Paris, France, assignor, by mesne assignments, to Bendix Brake Company, South Bend, Ind., a corporation of Illinois Original application February 11, 1929, Serial No. 348,392. Divided and this application July 27, 1932, Serial No. 625,135. In Belgium April 2, 1928

4 Claims. (Cl. 188—194)

This invention relates to brakes and more particularly to mechanism for actuating an automotive vehicle brake mounted upon a steering wheel, and to the automatic adjustment thereof.

Considerable difficulty is found in transmitting brake actuating forces to parts swiveling with the pivoted wheel in a manner such that the steering action of the wheel does not interfere with the braking operation. With the exception of the flexible cable and universal joint types of connection these steering devices are usually found difficult to adjust.

It is accordingly an object of this invention to provide a simplified linkage for the steering wheel of an automotive vehicle which is free from the difficulties above referred to.

A further object of the invention is to provide a brake linkage for a steering wheel for which no adjustment is required to transmit braking effort to the pivoted wheel evenly at all positions of the steering wheel.

A still further object of the invention is the provision of a novel automatic adjustment mechanism located in the linkage for operating the brakes of the steering wheel.

A further object is the provision of novel anti-friction means for transferring angular motion to axial motion and located with reference to the steering wheel king pin axis.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Figure 1 is a section through the axle, steering knuckle, king pin, and novel brake linkage;

Figure 2 is a section on the line 2—2 of Figure 1 showing the axial thrust mechanism;

Figure 3 is a modification as shown in Figure 1 including an automatic adjustment;

Figure 4 is a diagrammatic showing of one method of applying the actuating linkage to a steering knuckle;

Figure 5 shows a modified form of applying the actuating mechanism of Figure 1; and Figure 6 is a modified form of Figures 1 and 4.

Referring more particularly to Figure 1, there is shown therein a portion of the front axle 10, having a king pin 12, and a brake backing plate and steering axle support 14. The king pin 12 is provided with an enlarged cylindrical head 16 having circular inclined cam surfaces 18 on its end and is keyed against rotation with respect to the axle 10. An operating lever 20 having a cup-shaped end 22 of suitable diameter to rotate about the enlarged end 16 of the king pin 12 forms a cap thereover and is provided within with a cam secured against rotation and having complementary inclined circular surfaces 24. A pair of anti-friction balls 25 are located between the inclined surfaces on the king pin and the inclined surface of the cam 24 and are adapted to force the cup 22 to move axially upon rotation thereof.

A bearing member 26 may be placed upon the top of the cap member 22 and may engage an adjustable screw 28 at the end of the lever arm mounted on the brake actuating shaft 30. In order to secure the cam 24 against relative rotation with respect to the cap member 22, a shank 32 of angular shape may be fitted into a similar angular recess 34. A spring 36 secured to the enlarged head 16 of the anchor pin 12 is adapted to engage the lever 20 to effect return movement thereof. Suitable dust washers 38 and 40 may be provided as well as the bore 42 for the application of grease to the cam surfaces to protect the same from wear. As will be seen in Figure 2, it is preferable to use a pair of cam surfaces and a pair of balls arranged as shown; although, in practice any number may be found desirable.

In order to provide an automatic adjustment means to take up wear of the lining of the brake shoe and which may be actuated upon excessive movement of the brake linkage which results from such wear there may be provided, as shown in Figure 3, a pair of threaded members to axially extend the cap member to compensate for wear.

As shown in Figure 3 the king pin 50 which is secured against rotation on the front axle through which it passes is provided as before with inclined cam surfaces 52 and a complementary cam member 54 fixed for rotation with the operating lever 56 and anti-friction balls 58 providing spreading movement of the cam faces upon angular movement of the operating member 56. A cap member 60 which is adapted to rotate with the operating member 56 with respect to which it is free to move axially by reason of the slot 62, is provided to operate the crank arm 64 of the brake actuating lever on the shaft 30.

To transmit thrust between the operating lever 56 of the cap 60 there is provided a screw and nut 66 and 68 respectively. The screw 66 is provided with a square shank 70 which in turn is recessed in the cap 60 to prevent relative rotation therebetween. A ratchet member 72 is slidably keyed to the nut 68 and is urged toward the position shown by the resilient spring 74. A sleeve 76 which is pinned against rotation with respect to the king pin and axle carries a complementary ratchet 78 adapted to engage the ratchet member 72. The sleeve 76 is suitably cut away as at 80 in order to provide free movement of the operating lever 56.

Rotation of the operating lever 56 through a given angle will produce an axial thrust upon the crank arm projection 64 by means of the nut 68 and screw 66 and cap member 60. Rotation of the nut 68 carries with it the ratchet member 72, the teeth of which are so pitched so that upon excessive movement of the lever 56, the ratchet member 72 may advance one tooth on the ratchet teeth of the fixed sleeve 76. Upon return movement of the operating lever 56, the nut 68 will be forced to rotate relative to the screw 66 an amount equal to the angular pitch of the ratchet teeth. Thus upon each excessive movement of the operating lever 56 a lengthwise adjustment between the screw 66 and nut 68 takes place.

In Figure 4 there is shown mounted on the axle 10 the adjustment mechanism or operating mechanism of Figure 3 or Figure 1 as may be desired. A bracket 90 adapted for rotation with the steering wheel is pivoted on the king pin 12, as shown, and is provided with a support 92 upon which is pivoted an actuating wedge 94. In operation, tension may be applied to the cable 96 rotating the operating lever 98 which in turn produces an axial movement of the cap 100 and corresponding movement of the wedge 94. It will, of course, be appreciated that the wedge 94 may be adapted to spread the shoes of a brake or actuate any other suitable member or mechanism which may be employed in place of the wedge.

In Figure 5 there is shown a linkage for amplifying the movement of the operating sleeve 22 as shown in Figure 1. For this purpose on the axle 10 is provided a projection 11 and a lever 13 pivoted thereto. One end 15 of the lever is adapted to engage the operating arm 21 and actuate the mechanism as before described.

In Figure 6 there is shown a slightly different modification wherein an arm 101 is fixed to the king pin and axle 10 and carries thereon a pivot post 102, an operating lever 104 provided with a cam 106 bears upon the lever and actuating arm 108 to actuate the wedge 110 as may be readily understood.

In operation, in the apparatus of Figure 1 it will be readily observed that the lever 20 may be connected to any suitable brake linkage so as to be rotated upon brake application. The complementary inclined cam surfaces 18 and 24 with the ball 25 therebetween will upon rotation force the cap 22 to move axially with respect to the axle or king pin thus rocking the lever and shaft 30 which in turn may actuate a cam 31 within the brake. Suitable adjustment of Figure 1 is obtained by means of the thumb screw 28.

In Figure 3, the operation is similar to that of Figure 1 with the addition of automatic adjustment dependent upon the angular movement of the operating lever 56. As set forth, lever 56, sleeve 60 and screw 66 rotate together through equal arcs. The nut 68 likewise follows the lever 56, sleeve 60, and screw 66 unless rotated an angular distance greater than the pitch of the ratchet teeth, under which circumstances, it is prevented from return rotation with the screw, sleeve, and lever. Relative rotation between the screw and nut results in lengthwise adjustment thus taking up for wear.

Although several embodiments and modifications of the invention have been illustrated and described it is to be understood that the invention is not limited thereto but may be embodied in various mechanical forms; that such changes in construction and arrangement of parts may be made without departing from the spirit of the invention as will be well understood by those skilled in the art, reference will be had to the appended claims for a definition of the limits of the invention.

This application is a division of a copending application entitled "Brakes", Serial No. 348,392, filed February 11, 1929.

I claim:

1. An axle, a dirigible wheel having a brake pivoted thereto upon a substantially vertical axis, a cam secured to the axle having a cup shaped circular incline around said axis, an operating lever pivoted on said axis and having a cam having a complementary cup shaped circular incline, anti-friction means held in the pocket formed by said cup shaped members between said incline to thrust said operator along the axis upon operation thereof.

2. A brake comprising actuating mechanism, said actuating mechanism including a pair of complementary cup shaped circular inclines, anti-friction rolling members held therebetween, means for retaining one of said inclines against rotation and means for retaining one of said inclines against axial movement upon relative angular rotation.

3. A support, a pivoted brake operating member thereon, means for effecting axial movement upon rotation thereof, an axially arranged adjustable screw and nut mechanism for transmitting said axial movement, and ratchet means between said support and said screw and nut mechanism for effecting relative rotation and adjustment between said screw and nut upon extreme rotation of said operating member.

4. An automotive vehicle steering wheel, a brake thereon, an axle, a pivotal axis between said axle and wheel, a brake actuating member adapted for movement along said axis, a brake operating member in engagement with said actuating member pivoted on said axis, means for effecting axial brake actuating movement upon rotation of said operating member, mechanism for axial adjustment of said operating member and means for effecting an adjustment upon extreme movement of said operating member.

LUCIEN HERSOT.